Aug. 6, 1968  H. E. JACKSON  3,395,682
FUEL INJECTION SYSTEMS
Filed Feb. 14, 1966  6 Sheets-Sheet 4

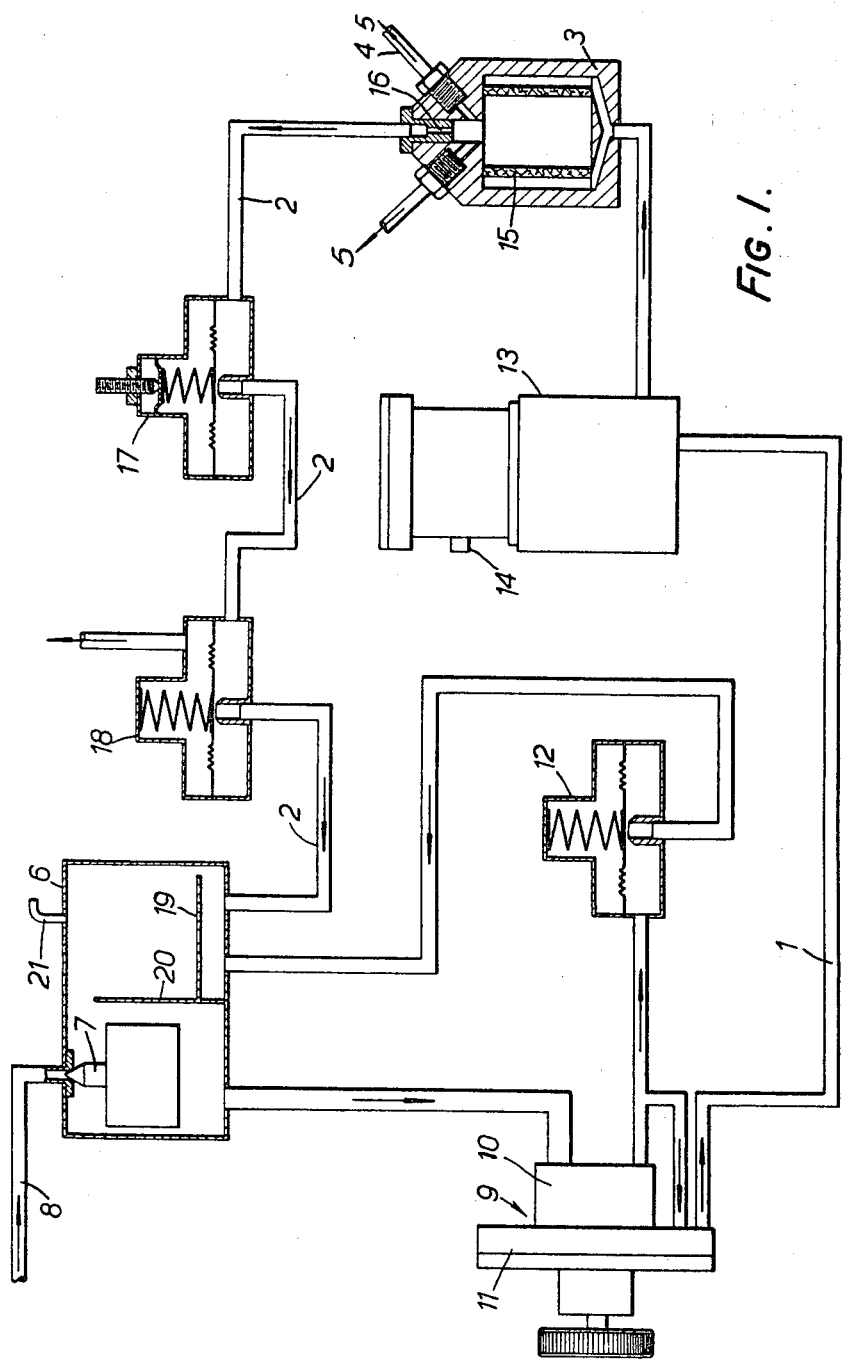
FIG. I.

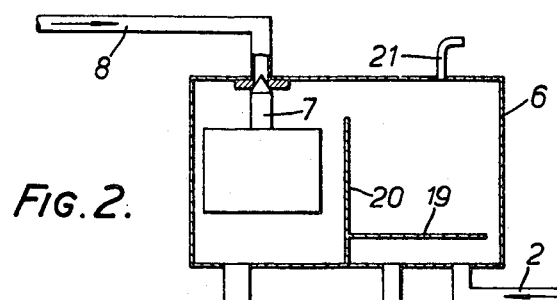
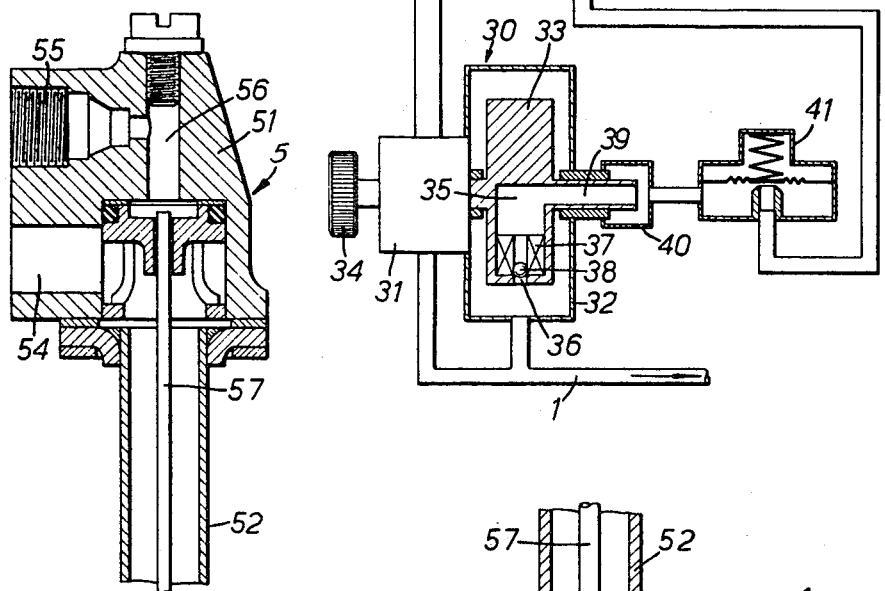
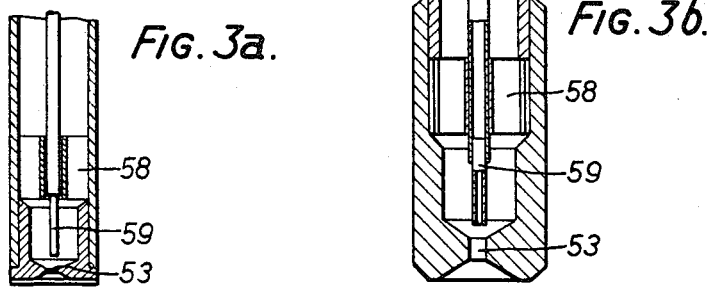

INVENTOR
H. E. JACKSON
BY
Holcombe, Wetherill & Brisebois
ATTORNEYS

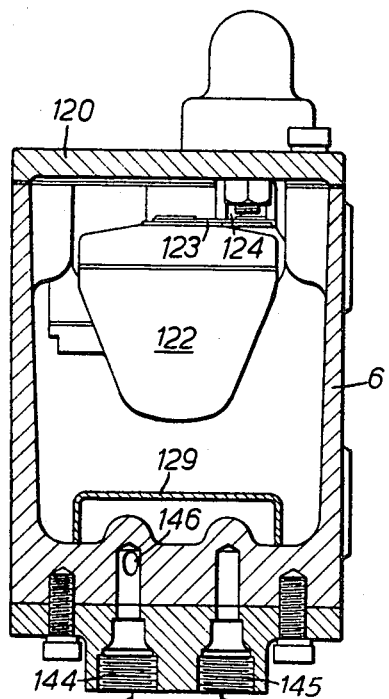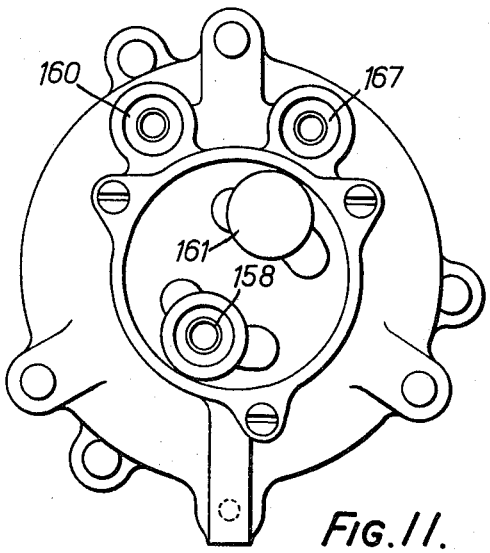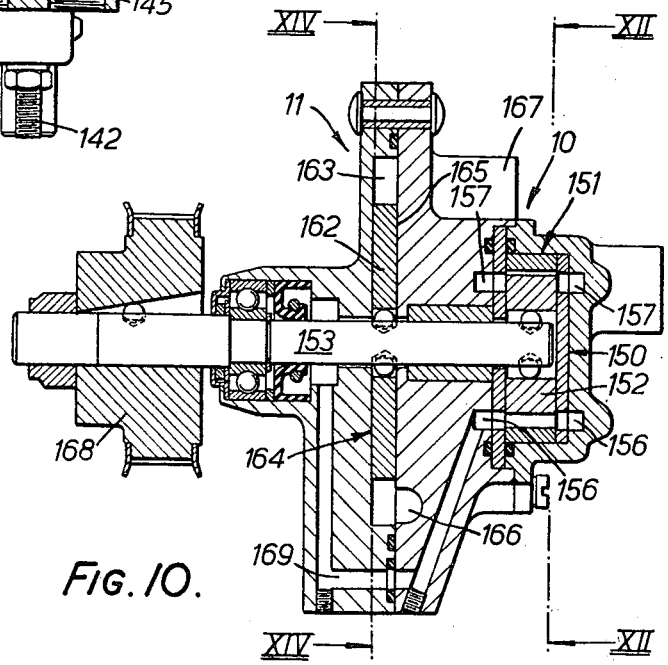

Inventor
H. E. Jackson
By
Holcombe, Wetherill & Brisebois
Attorneys

United States Patent Office 3,395,682
Patented Aug. 6, 1968

3,395,682
FUEL INJECTION SYSTEMS
Harold Ernest Jackson, Plympton St. Mary, Devon, England, assignor of one-half to Petrol Injection Limited, Plympton, Plymouth, Devon, England, a British company
Filed Feb. 14, 1966, Ser. No. 527,221
Claims priority, application Great Britain, Feb. 26, 1965, 8,528/65
14 Claims. (Cl. 123—139)

ABSTRACT OF THE DISCLOSURE

A continuous circulation, low pressure fuel injection system having fuel supply and return branches and vented injector nozzles fed from the supply branch. Fuel is continuously circulated by an engine driven, combined pressurising device in the supply branch comprising a feed pump supplying to a dynamic vortex-type pump a fuel always in excess of the inflow requirements of the latter pump (excess fuel being by-passed by a relief valve) so that the output pressure of the vortex-type pump follows a square law characteristic over substantially the whole of its operating range. A centrifugal relief valve, the opening pressure of which increases as the square of engine speed, also is disclosed for pressurising fuel in the supply branch. Fuel flow to the injector nozzles also is controlled by a flow control valve operated in response to engine manifold vacuum. The valve is operated by a piston slidable in a chamber connected via a flow restrictor to the manifold. A spring in the piston chamber applies an unseating force against a plate valve which, when unseated, vents the piston chamber. A seating force is applied to the plate valve by a diaphragm which communicates directly with the manifold so that the diaphragm responds to manifold vacuum changes in advance of change in pressure in the piston chamber. Any such changes cause imbalance between the seating and unseating forces acting on the plate valve and the piston moves until balance is restored.

---

Figures 4A, 4B, 4C, 5, 6:
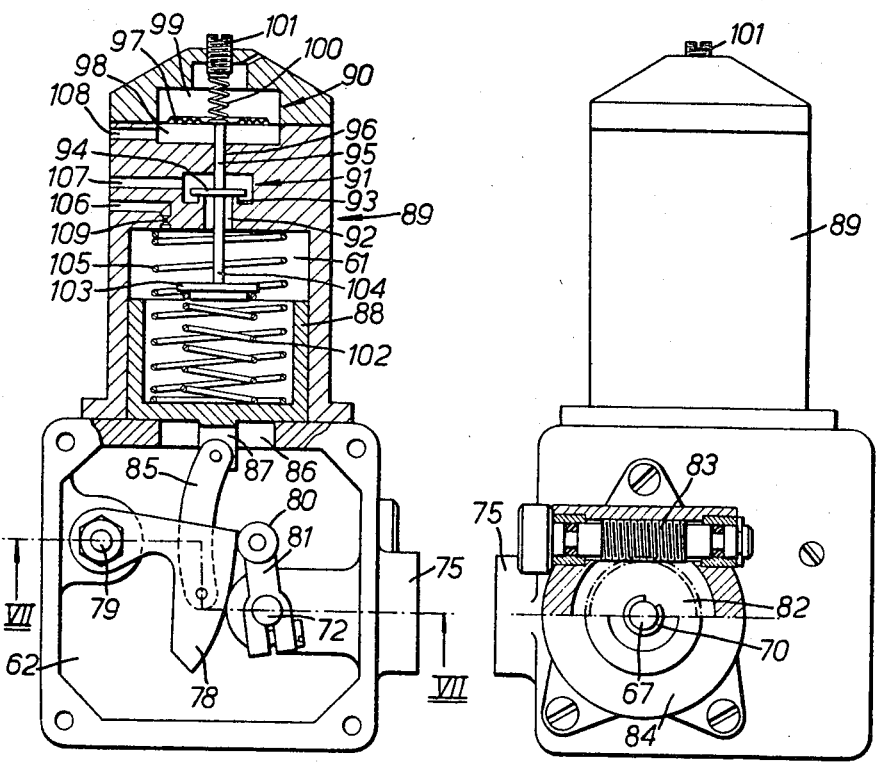

This invention relates to continuous low-pressure fuel injection systems for internal combustion engines and also to components suitable for use in such systems.

In some continuous low-pressure fuel injection systems fuel is metered, in dependence on engine requirements, to open fuel injector nozzles in which the fuel is entrained by atomising air, supplied at a suitable pressure by a pump, and discharged from the nozzle outlet orifice. The present invention proposes a fuel injection system which includes a fuel circulation conduit system through which fuel is continuously circulated, in operation of the system, at a pressure determined by engine speed, and discharged from injection nozzles that are vented to atmosphere.

According to the present invention, a continuous low-pressure fuel injection system for an internal combustion engine includes a fuel circulation conduit system having supply and return branches, vented fuel injector devices having open outlet orifices and connected to receive fuel from the supply branch of the fuel conduit, each injector device being constructed to discharge fuel through its outlet orifice without contact between the fuel and the confines of the orifice, engine drivable fuel pumping means in the fuel supply branch operable to pressurise fuel in dependence with engine operating speed and to circulate such fuel around the ring main conduit, and a fuel metering valve device connected in the fuel circulation conduit and operable to vary fuel flow to the injector devices in dependence on engine loading.

The supply branch of the fuel ring main conduit can contain a distribution chamber from which the injector devices are fed, the outlet from the chamber to the return branch of the conduit means being disposed at a level higher than the outlets to the injector devices so that any air or gas in the fuel passes to the return branch and not to the injector devices. The outlet to the return branch includes a flow restrictor which can be preset or variable, for example in dependence on atmospheric pressure conditions.

The return branch of the fuel circulation conduit can include, as required, an engine idling fuel control valve operable to shut-off or reduce return fuel flow at engine idling speeds, thereby increasing fuel supply to the injector devices.

The fuel circulation conduit system can also include a valve device for temporarily supplementing fuel supply to the injector devices under engine acceleration conditions, thereby minimising engine acceleration response time. The acceleration response valve device can take the form of a valve connected in the return branch of the fuel circulation conduit system and operable in response to changes in engine inlet manifold pressure. Under steady engine running conditions, a constant partial vacuum exists in the inlet manifold and the acceleration response valve is open, but should the throttle control be quickly opened, the inlet manifold vacuum decreases sharply towards atmospheric pressure and the acceleration response valve closes, shutting-off fuel flow through the return branch and thereby supplementing fuel supply to the injector devices until a fresh equilibrium partial vacuum exists in the inlet manifold when the acceleration response valve again opens.

For efficient operation of the system, the fuel circulation system is supplied from a vented float chamber and return fuel flows back to this float chamber. The portion of the chamber to which the return branch is connected contains a baffle device, disposed in front of the return branch connection, and a weir which separates that portion from the portion of the chamber supplying the fuel circulation system. Pressurised fuel fed back to the chamber through the return branch impinges on the baffle device and then circulates at reduced pressure upwards through the chamber and eventually over the weir into the other portion of the chamber. Any gas or air entrained in the fuel in the baffled portion of the chamber escapes through the vent, located in the roof of the chamber.

The fuel pumping means can conveniently be an engine driven pump device having a priming pump feeding a pressurising pump, both pumps being contained in a common housing and drivable by the engine. The pressurising pump can be a rotating ring pump and the priming pump a roller pump, both mounted on a common driving shaft. This arrangement is simple and inexpensive to manufacture yet efficient in operation. The priming pump ensures that fuel is sufficiently pressurized at low engine running speeds, it having been observed that at such speeds the rotating ring pump output pressure falls off from the usual square law characteristic.

Alternatively, the fuel pumping means can be an engine driven relief valve connected in the supply branch of the fuel circulation conduit system on the outlet side of a fuel pump. Such a relief valve can comprise an engine rotatable member having an aperture closable by an obturating member seated in the aperture by centrifugal force during rotation of the member. Pressurised fuel from the fuel pump is supplied to the relief valve which opens at a fuel pressure dependent on engine operating speed and thereby controls fuel pressure in the supply branch in dependence on that speed.

The fuel metering device can include a valve member operated in response to engine loading, e.g. as represented by engine inlet manifold pressure (vacuum) or engine throttle opening. In one embodiment, the fuel metering valve includes a cam-operated rotary valve, the cam being pivoted by movement of a piston exposed to inlet manifold vacuum conditions. Preferably, the piston is operated by a fluid-pressure-servomechanism to reduce friction effects on movement of the piston.

As mentioned previously, the fuel injector devices are adapted to discharge fuel through their outlet orifices without contact with the walls of the orifices. To this end, the injector nozzle construction can take the form of an outer tube in one end of which there is formed the outlet orifice and the other end of which is open to atmosphere. From a fuel inlet a fuel tube extends into the outer tube and terminates close to and in alignment with the outlet orifice. This outlet end of the fuel tube comprises a flow restrictor in the form of a fine bore metal tube, for example of precision drawn stainless steel. The outlet bore of the fuel tube is sufficiently less than that of the outlet orifice that the emergent fuel stream passes through the outlet orifice, without contacting the walls of the latter, and then breaks up into a fine spray. It is to be noted that this atomisation of the fuel is effected without the use of any atomising agent or device within the injector device. If it is necessary or desirable to supplement atomisation of the fuel stream emergent from the injector devices, a suitable impingement surface can be disposed externally of the device and in front of the outlet orifice. Suitable forms of such impingement surfaces are strips of material having, for example, rectangular, circular or triangular cross-sections or small plate members etc. Typically, the outlet end of the fuel tube can have a bore diameter of several thousandths of an inch whilst the outlet orifice bore diameter is of the order of several ten thousandths of an inch; in a particular embodiment the bore diameters are 0.012 inch and 0.035 inch, respectively.

In a fuel injection system according to the present invention, the fuel pressure in the fuel circulation conduit system during operation of the engine typically rises to about 90 p.s.i. at an engine speed of 6000 r.p.m. Continuous circulation of the fuel through the conduit system, with the highest circulation rate occurring at high engine speed and low engine loading, ensures a self-cooling system. The injector devices are located in individual branch pipes from the engine inlet manifold to the engine cylinders and fuel is injected continuously into these branch pipes, being admitted to the cylinders during the intake portion of the combustion cycle. This form of fuel injection results in commencement of fuel vaporisation prior to admission of fuel into the engine cylinders and the rate of vaporisation can be determined by controlling the size of the atomised fuel droplets.

The fuel metering valve can be located either in the supply or the return branch of the fuel circulation conduit system and is controlled in response to engine loading. For an engine having a volumetric efficiency that varies little with engine speed, control in response to engine inlet manifold vacuum is sufficient. However, control in response to engine throttle opening also can be employed.

Location of the connections from the supply branch to the injector devices below the connection from the supply branch to the return branch of the circulation conduit system, ensures that any gas or air in the fuel separates out and passes to the return branch and not to the injector devices. Venting of the injector devices ensures that the pressure in the injector devices cannot fall below atmospheric pressure, even though the interior communicates via the outlet orifices with the interior of the inlet manifold, and that injection is not adversely affected by the vacuum conditions in the inlet manifold.

Use of the vented float chamber described previously, having baffle and weir devices, prevents turbulence in the float chamber and separates any gas or air from the fuel.

Figure 7:
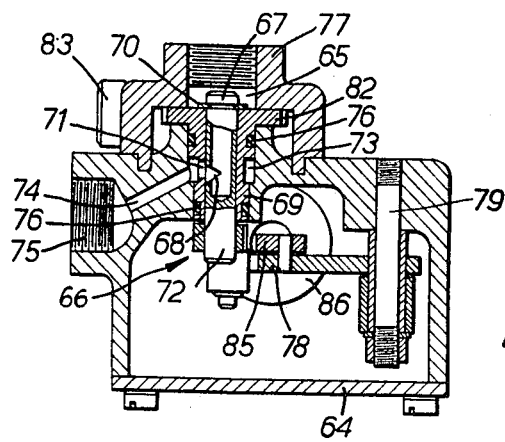
Figure 8:
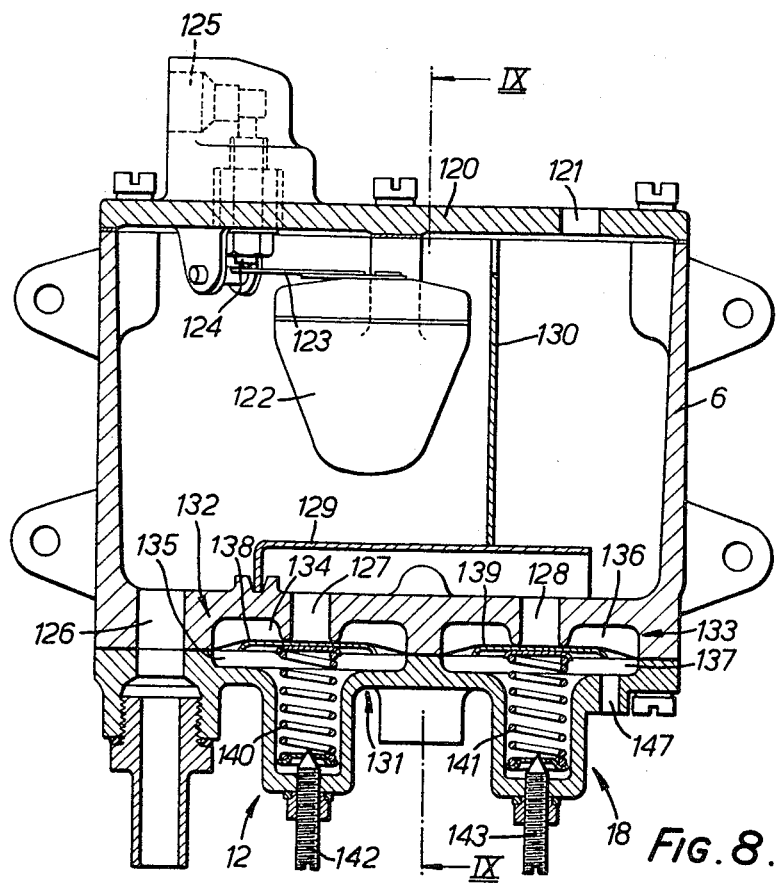
Figures 12, 13:
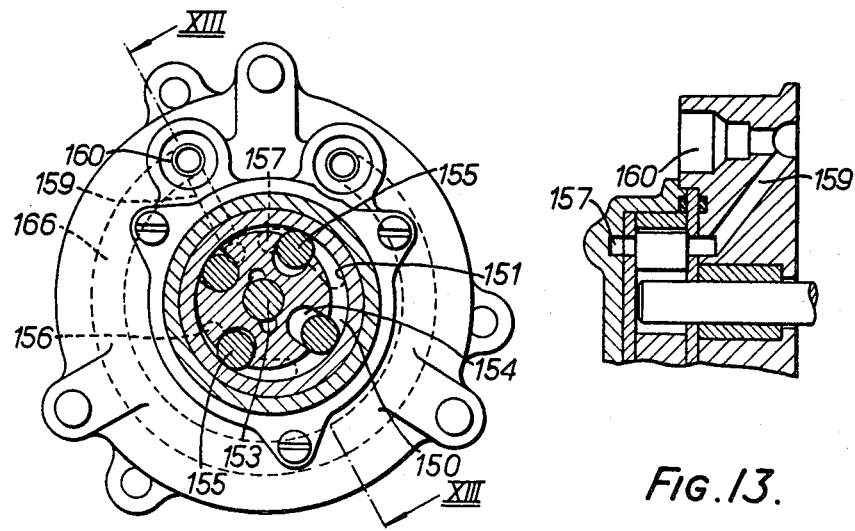
Figure 14:
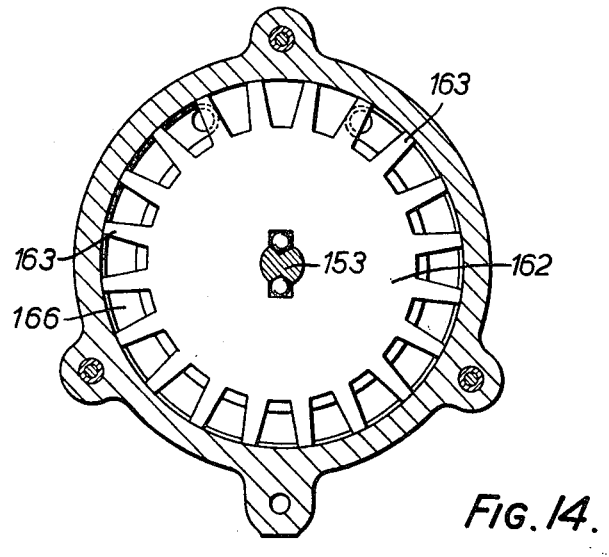

By way of example, embodiments of the invention, and components suitable for use therein, will be described in greater detail with reference to the accompanying drawings, of which:

FIG. 1 illustrates diagrammatically a fuel injection system according to the invention, FIG. 2 illustrates diagrammatically a modified form of the system shown in FIG. 1, FIGURE 3a is an axial section thru one of the injector devices shown schematically in FIGURE 1, FIGURE 3b shows the lower part of the injector in axial section on a larger scale, FIGURES 4a, b, and c show various modifications of the impingement surface beneath the discharge orifice of the injector of FIGURES 3a, b, FIG. 5 is an elevational section of the fuel metering valve shown in FIGS. 1 and 2, FIG. 6 is another elevation, having a detail section, of the valve shown in FIG. 5, FIG. 7 is a cross-section on the line VII—VII in FIG. 5, FIG. 8 is an elevational section of the float chamber forming part of the system shown in FIGS. 1 and 2, FIG. 9 is a cross-section on the line IX—IX in FIG. 8, FIG. 10 is an axial section of the combined priming/pressurising fuel pump forming part of the system shown in FIG. 1, FIG. 11 is an end view of FIG. 10, FIG. 12 is a cross-section on the line XII—XII in FIG. 10, FIG. 13 is a part section on the line XIII—XIII in FIG. 12, and FIG. 14 is a cross-section on the line XIV—XIV in FIG. 10.

One system embodying the invention is illustrated by FIG. 1. The system has a fuel circulation conduit system including a fuel supply branch 1 and a fuel return branch 2. The supply branch 1 contains a distribution chamber 3 connected by conduits 4 to respective fuel injector devices 5 (shown in and to be described in more detail with reference to FIG. 3). The injector devices are located in branch pipes leading from the engine inlet manifold to the respective engine cylinders. The return branch 2 extends from the chamber 3 to a vented float chamber 6 having a float controlled needle valve 7 controlling admission of fuel to the float chamber from a feed line 8. The feed line 8 is supplied with fuel from a tank by a conventional fuel pump, the latter two components not being illustrated.

An engine driven fuel pump mechanism 9 circulates fuel from the float chamber 6 through the supply and return branch conduits 1, 2 at a pressure increasing with engine speed. The pump mechanism 9 comprises a priming pump 10 which supplies fuel to a pressurising pump 11 at a pressure determined by a relief valve 12 connected between the outlet of the priming pump 10 and the float chamber 6. The output from the pressurising pump 11 passes to the supply branch 1 which contains a fuel metering valve 13 controlled by changes in engine inlet manifold vacuum (for illustration shown applied at a port 14), to vary the area of an orifice in the supply branch and thereby adjust fuel flow to the chamber 3, and to the injector devices 5, in dependence on the inlet manifold vacuum.

The supply branch conduit 1 is connected to the floor of the distribution chmaber 3, fuel flowing through a filter element 15 in the chamber before passing to the injector device feed conduits 4 and the return branch conduit 2. The outlet from the chamber 3 to the return branch conduit 2 contains a flow restrictor 16 and is located at the top of the chamber 3, being disposed above the outlets from the chamber to the feed conduits 4.

The return branch conduit 2 can be connected directly back to the float chamber 6 or can contain an engine idling control valve 17, an engine acceleration response control valve 18 or, as shown in FIG. 1, both.

Under normal engine operating conditions, in which the engine is running at a steady speed with the throttle partly open and a partial vacuum existing in the inlet manifold, the pump mechanism 9 supplies fuel at a pressure dependent on the engine operating speed to the supply branch conduit 1. The metering valve 13, acting as a variable flow restrictor, presents a restriction to fuel flow to the distribution chamber 3, the restriction being determined by the prevalent inlet manifold vacuum.

From the distribution chamber 3, fuel flow divides between the feed conduits 4 and the return branch 2 in dependence on the restrictor 16 in the outlet to the return branch 2 and flow equalising restrictors in the actual injector devices. Disposition of the outlet from the distribution chmaber to the return branch 2 at a level above the outlets to the feed conduits 4, ensures that any gas or air in the fuel passes to the return branch 2 and not to the feed conduits 4 and injector devices 5.

Under these steady engine running conditions, the engine idling control valve 17 and the acceleration response control valve 18 are open and fuel passes back to the float chamber 6. Within the float chamber 6, and located in front of the connection of the return branch 2 and the relief valve 12, is a baffle plate 19, against which fuel entering from the conduits impinges and then passes upwards through the float chamber and over a weir plate 20 into the supply region of the float chamber containing the float. The baffle plate 19 together with the weir plate 20 prevents turbulence in the fuel contained in the float chamber that is supplied to the pump mechanism 9. Any such turbulence would result in an undesirable admixture of gas and fuel being supplied to the pump mechanism 9. Any gas in the fuel passing from the baffle plate 19 to the weir plate 20, separates out and escapes through a vent 21 in the roof of the float chamber 6.

FIG. 2 shows a modification of the system shown in FIG. 1, in which the pump mechanism 9 is replaced by an engine driven relief valve mechanism 30 for pressurising fuel in dependence on engine speed. Fuel from the float chamber 6 is supplied by a priming pump 31 to a housing 32 within which is mounted a cylindrical rotary member 33. The rotary member 33 and the priming pump 31 have a common driving shaft connected to a toothed wheel 34 for drivably coupling the shaft to the engine.

The rotary member 33 has a chmaber 35 with an aperture 36 in its outer peripheral surface. Within the chamber 35 extending radially in line with the boundary of the aperture 36 are toothed members 37 providing guide surfaces between which a ball 38 can travel. The chamber 35 is connected by a conduit 39 to a chamber 40 in turn connected via a relief valve 41 to the float chamber 6. The outlet from the priming pump 31 to the housing 32 also is connected to the supply branch conduit 1 of the fuel circulation conduit system connected, as in FIG. 1, to the fuel metering valve.

The relief valve mechanism 30 operates as follows. During operation of the engine, the pump 31 and the rotary member 33 are driven in dependence on engine operating speed and pressurised fuel is supplied by the pump 31 to the housing 32. Rotation of the rotary member 33 results in the ball 38 being urged towards a seated position in the aeprture 36 by a centrifugal force dependent on engine operating speed, and urged towards an unseated position by fuel pressure in the housing 32. The fuel pressure in the housing 32 assumes a level that balances the centrifugal seating force and hence the fuel pressure in the supply branch 1 is dependent on engine operating speed.

Fuel passing through the aperture 36 flows through the toothed members 37 via the chamber 35, conduit 39 and relief valve 41 back to the float chamber 6. The relief valve 41 is not essential but when used imposes a minimum fuel pressure in the housing 32 and the supply branch conduit 1.

The remainder of the modified system is identical to that described with reference to FIG. 1.

The construction of the injector devices 5 is shown in more detail in FIG. 3. Each injector device 5 has a body portion 51 from which projects an outer tube 52 at the distal end of which is a fuel discharge orifice 53, having, for example, a bore diameter of 0.035 inch. The outer tube 52 is vented to atmosphere by a port 54 in the body portion 51. The body portion 51 also has a fuel inlet port 55 communicating via a passage 56 with a fuel pipe 57 extending within the outer tube 52 and terminating just short of the discharge orifice 53. The fuel tube 57 is centralised in the outer tube 52 by a clip device 58 and at its outlet end has a portion 59 of reduced bore diameter, for example 0.012 inch, that acts as a flow equalising restrictor.

Fuel supplied to the inlet port 55 passes along the fuel pipe 57 and is ejected from the outlet portion 59 in the form of a fine stream passing through the discharge orifice 53. The diameter of the outlet orifice in relation to the disposition and bore diameter of the outlet portion 59 of the fuel pipe is such that the fuel stream emergent from the outlet portion 59 passes through the discharge orifice 53 without contacting the bore walls thereof. After discharge from the orifice 53, the fuel stream breaks up into droplets.

The vent port 54 ensures that the interior of the outer tube 52 always is at atmospheric pressure so that the inlet manifold vacuum, to which the interior of the tube 52 is exposed via the discharge orifice 53, does not affect the supply of fuel to the injector devices.

The breaking up, or atomisation, of the fuel stream emergent from the discharge orifice 53 can be enhanced, if necessary or desirable, by providing an impingement surface on the exterior of the injector devices and located in front of the discharge orifice 53. Suitable forms of impingement surface are shown in FIG. 4. FIG. 4a shows a rectangular strip positioned in front of the orifice 53 whilst FIGS. 4b and 4c show triangular and circular section wires extending across the mouth of the orifice 53.

It will be appreciated from the description of FIGS. 1–4, that in the fuel injection systems described atomising air is not utilised and atomisation of the fuel takes place following discharge from the injector devices. Whilst impingement surfaces located externally of the injector devices can be used, this is an optional feature. The interior of the injector devices is not exposed to pressurised air but merely vented to atmosphere. The systems described are efficient in operation and simpler and more economical in construction than systems utilising pressurised air as an atomising medium.

Other component parts of the system shown in FIG. 1 will be described in more detail with reference to FIGS. 5–14.

The metering control valve 13 is shown in more detail in FIGS. 5–7 and has a casing within which are defined chambers 61 and 62. The chamber 62 is generally rectangular in section having one side closed by a cover plate 64 (FIG. 7) and in a thickened portion of the opposite wall there is a cylindrical aperture 65 accommodating a metering valve 66. The metering valve comprises a tubular member 67 having, intermediate its ends, an elongated transversely extending slot 68 extending approximately diametrically across the member 67. The edge faces of the slot 68 converge towards the interior of the tubular member 67 and, projected, define a V-section. For convenience, the slot 68 will hereafter be referred to as a V-slot. The tubular member 67 is disposed within a sleeve 69, being located by a spring clip 70 engaging the periphery of the tubular member 67 and an end face of the sleeve 69 so that the V-slot 68 is axially aligned with a rectangular aperture 71 in the wall of the sleeve 69. The valve member 67 closely fits the sleeve 69 but can be rotated therein to bring the V-slot 68 and the aperture 71 into registration to define a metering orifice and also to vary the degree of registration and hence the area of the metering orifice. The width of the aperture 71 corresponds to the greatest width of the V-slot 68 and the peripheral length of the aperture corresponds to about half the peripheral length of the V-slot.

The tubular member 67 has a closed end 72 and the sleeve 69 is disposed in the aperture 65 so that the closed end 72 of the tubular member 67 projects beyond the sleeve into the chamber 62. Extending around the periphery of the sleeve 69, in communication with the aperture 71, is a recess 73 that registers with a passage 74 in the thickened wall portion of the chamber 62 leading to an inlet port 75 connected to receive fuel from the pump 11, FIG. 1. O-ring seals 76 on either side of the recess 73 prevent leakage between the sleeve 69 and the bore of the aperture 65.

The open end of the tubular member 67 leads to an outlet port 77 connected to the fuel distribution chamber 3 (FIG. 1). Thus, the area of the metering orifice defined by the V-slot 68 and the aperture 71, controls the amount of fuel fed to the injector devices 5 and by arranging that the metering orifice area increases with increasing engine inlet manifold vacuum, in a desired manner, the fuel supply to the injector devices 5 can be controlled in dependence on the engine inlet manifold vacuum. Such control of the metering valve 66 is effected by a cam 78 pivoted on a pin 79 supported from the wall of the chamber 62 in which is defined the aperture 65. The cam face of the cam 78 co-operates with a cam follower 80 carried by an arm 81 clamped to the end 72 of the metering valve member 67 projecting into the chamber 62. The sleeve 69, at the end adjacent the open end of the valve member 67, is formed as a gear 82 engaging with a screw 83 captively mounted in a cover 84 which defines the outlet port 77. Thus, pivotal movement of the cam 78 about the pin 79 causes rotation of the valve member 67 within the sleeve 69 and such rotation is made to vary the area of the aperture 71 uncovered by the V-slot 68, as will be described later.

A link 85 is pivoted at one end to the cam 78, the other end extending through an aperture 86 in the wall of the chamber 62 to one side of the valve 66, being pivoted at its other end to a boss 87 formed on the head of a hollow piston 88 slidably mounted in the cylindrical chamber defined in a housing 89 which contains a fluid-pressure servo-control unit for the valve. The housing 89 also defines an outer chamber 90 and a chamber 91 intermediate the chambers 61 and 90. The chamber 91 is connected by a passage 92 to the chamber 61 and has a valve seating 93 for a plate valve 94 controlling communication between the chambers 61 and 91. The plate valve 94 bears against one end of a pin 95 slidably passing through a closely fitting passage 96 between the chambers 91 and 90. The other end of the pin is acted on by a resilient diaphragm 97 dividing the chamber 90 into two compartments 98 and 99, the latter containing a spring 100, adjustable by a screw 101, bearing on the diaphragm 97.

The piston 88 is urged towards the aperture 86 by a spring 102 one end of which being against the inner end face of the piston and the other against a cap 103 engaged with a pin 104 bearing against the plate valve 94. A relatively weak return spring 105 bears between the outer end of the chamber 61 and the inner end face of the piston 88.

The housing 89 also defines three ports 106, 107 and 108. The port 106 communicates via a flow restrictor 109 with the chamber 61 at the outer end thereof; the port 107 communicates with the chamber 91; and the port 108 communicates with the compartment 98 of the chamber 90. The ports 106 and 108 are exposed to engine inlet manifold vacuum whilst the port 107 is vented to atmosphere.

The metering valve operates as follows. With the engine operating under a particular vacuum condition in the inlet manifold, the piston 88 and the compartment 98 are exposed to that inlet manifold vacuum. The vacuum in the compartment 98 causes the diaphragm 97 to flex and increase the seating force on the plate valve 94, decreasing the leak of atmospheric air from the vent port 107 past the plate valve into the chamber 61 and thereby increasing the vacuum in that chamber. This causes the piston 88 to move away from the aperture 86, compressing the spring 102 which exerts an unseating force on the plate valve 94, thereby tending to increase leakage of atmospheric air into the chamber 61 until a state of balance between the forces acting on the valve disc exists.

The seating force on the plate valve 94 are the constant force (F1) exerted by the spring 100 and the inlet manifold vacuum (V) multiplied by the area (A) of the diaphragm 97. In equilibrium conditions, these seating forces are balanced by the unseating force which is the load (F2) exerted by the spring 102.

Thus, in equilibrium conditions $$F1+VA=F2$$

In other words, the position of the piston 88 is dependent on the inlet manifold vacuum pressure and the effects of friction between the piston 88 and the wall of the chamber 61 are negligible.

Movement of the piston 88, in response to changes in inlet manifold vacuum, pivots the cam 78 thereby moving the cam follower 80 and rotating the valve 72 to vary the area of the metering orifice defined by the V-slot 68 and the aperture 71. It is arranged that for increasing inlet manifold vacuum, the movement of the piston 88 causes increase in the area of the metering orifice and in the quantity of fuel supplied to the metering chamber 3 and the injector devices 5.

FIGS. 8 and 9 show the float chamber 6 in greater detail, the valves 12 and 18 being incorporated in the construction.

The float chamber has a roof 120 in which there is a vent aperture 121. The chamber 6 has a float device 122 carried by a pivoted arm 123 which bears against a needle valve 124 controlling fuel flow from an inlet port 125 (connected to the feed line 8) into the chamber. In the floor of the chamber 6 is an outlet port 126 (connected to the inlet of the priming pump 10) and fuel return ports 127 and 128 respectively. Supported on the floor of the chamber 6 in front of the ports 127 and 128 is a baffle plate 129 (19, FIG. 1) in the form of a three-sided box, the open side being remote from the outlet port 126. The baffle plate 129 supports an upstanding weir plate 130 (20, FIG. 1) terminating just below the roof 120.

A casting 131 is secured to the floor of the chamber on the outside of the floor and co-operates therewith to define two chambers 132 and 133 respectively. These chambers are divided into compartments 134, 135 and 136, 137 by respective resilient diaphragms 138 and 139 which bear against seatings defined by the return ports 127 and 128. The compartments 134 and 136 communicate with the ports 127 and 128 under control of the diaphragms 138 and 139 respectively. The compartments 135 and 137 contain springs 140 and 141 adjustable by screws 142 and 143, bearing against the diaphragms 138 and 139 respectively.

The components 132, 134, 135, 138, 140, 142 together define the relief valve 12 shown in FIG. 1. The components 133, 136, 137, 139, 141, 143 together define the acceleration response control valve 18 shown in FIG. 1.

As best shown in FIG. 9, the casting 131 has a central boss containing two fuel inlet ports 144 and 145, the former being connected by a passage 146 to the compartment 134 of valve 12 and the latter by a similar passage (not shown) to the compartment 136 of valve 18. The casting also has an inlet port 147 communicating with the compartment 137 of the valve 18.

To incorporate the float chamber shown in FIGS. 8 and 9 into the system shown in FIG. 1, the fuel inlet port 125 is connected to the fuel supply line 8, the outlet port 126 to the inlet of the priming pump 10, the port 144 to the outlet from the main pump 11, the port 145 to the fuel return branch conduit 2 extending from the idling control valve 17 and the port 147 is connected to the inlet manifold for exposure to the vacuum conditions therein.

A suitable construction of the pumping mechanism 9 is shown in FIGS. 10–14.

The priming pump 10 has a cylindrical pumping chamber 150 the peripheral wall 151 of which defines a cam track. The chamber 150 contains a rotor 152 keyed to a driving shaft 153 for rotation therewith. The rotor has angularly spaced parallel sided slots 154 containing respective pumping elements in the form of rollers 155 which are movable along the slots and cooperate with the cam track 151 during rotation of the rotor. In the outer end faces of the chamber 150 are defined two sets of arcuate slots 156 and 157, the former communicating with an inlet port 158 and the latter via an internal passageway 159 with the inlet port 160 of the pressurising pump 11. The slot 157 also communicates with an outlet port 161 from the priming pump 10 which is blanked off.

The pressurising pump 11 has a rotor 162 keyed to the shaft 153 and formed with circumferential vanes or teeth 163. The rotor 162 is mounted for rotation in a shallow cylindrical chamber 164 one end face 165 of which has an arcuate groove 166, registering with the vanes 163, describing an arc of about 305° around the end face 165. One end of the groove 166 is connected to the inlet port 160 and the other end to a fuel outlet port 167. The shaft 153 is connected to a drive pulley 168, for coupling to the engine.

An internal passageway 169 communicates between the shaft and the arcuate slot 156 of the priming pump 10.

In use of the pump mechanism, the priming pump inlet port 158 is connected to receive fuel from the float chamber 6, as shown in FIG. 1, the inlet port 160 of the pressurising pump 11, apart from the internal connection 159 with the outlet from the priming pump, is also connected to the relief valve 12 and the outlet port 167 is connected to the metering control valve 13. The pulley 168 is coupled to the engine for rotation thereby.

When the pulley is driven, it rotates the rotors 152 and 162 at a speed dependent on engine operating speed. Rotation of the rotor 152 causes the rollers 155 to engage with the peripheral cam track 151 and to define intake and outlet spaces sealed from each other but respectively registering with the slots 156 and 157. As roller 155 moves past the slot 156 fuel enters into the space defined between the rotor 152 and the cam track 151 over a peripheral length of the rotor defined by that roller 155 and the next following one. The fuel contained in this space is then swept towards the slot 157, as the rotor continues to rotate, and as the leading roller passes the slot 157 the clearance between the rotor and the cam track 151 decreases so that fuel is forced through the slot 157 at an increased pressure. This pressurised fuel passes from the slots 157 through the passage 159 to the inlet port 160 of the main pump 11.

From the inlet port 160 fuel enters one end of the arcuate groove 166 and is swept around the groove by the teeth 163 of the rotor 162. At the other end of the groove, the velocity energy of the fuel is converted to pressure energy, forcing the fuel out through the outlet port 167. Thus, the fuel pressure at the outlet 167 is dependent on the speed of rotation of the rotor, and hence on the engine speed. This pressure has added to it a relatively small standing pressure due to the priming pump 10.

Whilst over most of the engine operating speed range the pump 11 generates an outlet pressure proportional to the square of engine speed, the pressure falls off from this relationship at very low engine speeds and the priming pump 10 corrects this falling-off and ensures that the fuel pressure at the outlet port 167 is sufficient at these low engine speeds to maintain adequate fuel circulation through the supply conduit 1.

I claim:

1. A liquid flow control apparatus including a housing defining a chamber having a piston member mounted for slidable movement therein, a rotatable, liquid flow control valve member, means operably linking said piston and said rotary valve member to cause rotation of said valve member in response to sliding movement of said piston, said housing defining first, second and third passages, said first passage containing a fixed flow restrictor and communicating with said chamber and being connectable to a control vacuum source, said second passage defining a valve seating and connected at one end with said chamber and at its opposite end being vented to atmosphere, a second valve member adapted for operative co-operation with said seating to control venting of said chamber to atmosphere, resilient means contained by said chamber and urging said second valve member towards an unseated position, said third passage being connectable with said vacuum control source and operably communicating with a fluid pressure responsive device whereby response of said fluid pressure responsive device leads to a change in level of vacuum in said chamber following a change in level of vacuum of said vacuum control source, means connecting said fluid pressure responsive device to said second valve member to apply to said second valve member a seating force which increases with increasing vacuum level of said vacuum control source, said seating and unseating forces acting on said second valve member normally balancing each other and changes in vacuum level of said control vacuum source initially causing imbalance of said seating and unseating forces and consequent change in vacuum level in said chamber causing sliding movement of said piston to restore balance between said seating and unseating forces.

2. Apparatus according to claim 1, wherein said fluid pressure responsive device comprises a diaphragm dividing a second chamber in said housing into first and second compartments, said first compartment communicating with said third passage and said second compartment being vented to atmosphere, means coupling said diaphragm and said second valve member resilient means biasing said diaphragm to cause said coupling means to exert a predetermined seating force on said second valve member, and flexure of said diaphragm in response to increasing or decreasing vacuum level of said vacuum control source causing said coupling means to increase or decrease respectively said seating force on said second valve member.

3. Apparatus according to claim 1, wherein said means operably linking said piston and said rotary valve member comprises a pivoted cam member, cam follower means engaging said cam member and connected with said rotary valve member for rotation of said rotary valve member in response to pivotal movement of said cam member, and means linking said piston and said cam member for pivoting said cam member in response to said sliding movement of said piston.

4. A continuous low-pressure fuel injection system for an internal combustion engine having an air intake manifold structure including a fuel circulation conduit system having supply and return branches, fuel injector devices each including a fuel inlet connected to receive fuel from said supply branch, said injector devices having discharge orifices disposed in said manifold structure, engine drivable fuel pressurisation means in said supply branch operable to pressurise fuel in proportion to the square of engine speed and to circulate fuel around said conduit system, and fuel flow control valve apparatus connected in said circulation conduit system downstream of said pressurisation device for controlling fuel flow to said injector devices in dependence on engine loading represented by vacuum level in said manifold structure, said fuel flow control apparatus including a housing defining a chamber having a piston member mounted for slidable movement therein, a rotatable, fuel flow control valve member, means operably linking said piston and said rotary valve member to cause rotation of said valve member in response to sliding movement of said piston, said housing defining first, second and third passages, said first passage containing a fixed flow restrictor and communicating with said chamber and being connected to said manifold structure for response to vacuum level in said structure, said second passage defining a valve seating and connected at one end with said chamber and at its opposite end being vented to atmosphere, a second valve member adapted for operative co-operation with said seating to control venting of said chamber to atmosphere, resilient means contained by said chamber and urging said second valve member towards an unseated position, said third passage being connected with said manifold structure and operably communicating with a manifold structure vacuum responsive device whereby response of said vacuum responsive device leads to a change in level of vacuum in said chamber following a change in level of vacuum in said manifold structure, means connecting said vacuum responsive device to said second valve member to apply to said second valve member a seating force which increases with increasing vacuum level in said manifold structure, said seating and unseating forces acting on said second valve member normally balancing each other and changes in vacuum level in said manifold structure initially causing imbalance of said seating and unseating forces and consequent change in vacuum level in said chamber causing sliding movement of said piston to restore balance between said seating and unseating forces.

5. A fuel injection system as claimed in claim 4, wherein said engine drivable fuel pressurisation means comprises a pump housing within which are accommodated a positive displacement priming pump and a pressurising device, said priming pump and pressurising device each having operating members mounted on a common driving shaft for rotation by said engine, said priming pump having an outlet disposed within said pump housing and said pressurising device having an inlet disposed within said pump housing, means disposed internally of said pump housing and connecting said priming pump outlet and said pressurising device inlet, by-pass valve means connected to the outlet of said priming pump, said priming pump adapted to supply fuel to said pressurising device always in excess of input flow requirements of said pressurising device, said excess fuel being by-passed by said by-pass valve, and wherein said fuel pressurising device comprises two spaced surfaces defined internally of said housing, at least one of said surfaces defining a part-circumferential groove, and a disc mounted on said driving shaft for rotation therewith, said disc having circumferentially spaced, radially extending teeth, said teeth registering with said groove, the said inlet of said pressurising device communicating with one end of said groove and the other end of said groove communicating with a fuel outlet of said pressurising device, said toothed disc being operatively rotatable to sweep fuel from said pressurising device inlet along said groove at a velocity increasing with speed of rotation of said engine drivable driving shaft and to expel said swept fuel through said pressurising device outlet at a pressure which increases as the square of the rotary speed of said toothed disc.

6. A fuel injection system as claimed in claim 4, in which each of the said fuel injector devices has an outer tube in one end of which is formed the said discharge orifice, the other end of the tube being vented to atmosphere, and a fuel tube extending into the outer tube, said fuel tube connected at one end to said fuel conduit supply branch and terminating at its other end close to and in alignment with the outlet orifice of the injector device, the said other end of the fuel tube having a bore size less than the bore size of said outlet orifice.

7. A fuel injection system as claimed in claim 4, in which the said fuel supply branch includes a distribution chamber having outlets connected to the said one ends of the fuel tubes of said injector devices, said outlets being located in the distribution chamber at a lower level than a further outlet from the distribution chamber connected to the said fuel return branch, said further outlet containing a fixed flow restrictor.

8. A fuel injection system according to claim 4, and including a vented fuel reservoir chamber connected to supply fuel to the said fuel pressurising device and to receive fuel from the said return branch of the said fuel circulation conduit, the said reservoir chamber containing a baffle device disposed in front of the connection of the chamber with said return branch, and a weir separating the portion of the chamber into which fuel flows and the portion of the chamber out of which fuel flows.

9. Apparatus as claimed in claim 3, in which said rotary valve member includes a tubular member rotatably mounted in a closely fitted sleeve, said tubular member having intermediate its ends a transverse elongated slot, the width of said slot varying along the length of the slot, the said sleeve having an aperture with which said slot can register, and in which pivotal movement of said cam member rotates said tubular member to adjust the area of the said slot in registration with the said aperture in the sleeve.

10. A fuel injection system as claimed in claim 5, in which said groove extends over an arc of about 305 degrees.

11. A fuel injection system as claimed in claim 4, in which the said fuel pressurising device includes a fuel pump having an outlet to which is connected a relief valve having an engine drivable hollow rotary member including an orifice communicating on one side with the said fuel supply branch, and an orifice closure member disposed within said rotary member for seating in the said relief valve orifice on its other side by centrifugal force during rotation of the rotary member, said other side of said orifice being connected with said fuel return branch.

12. A continuous low-pressure fuel injection system for an internal combustion engine having an air intake manifold structure including a fuel supply conduit system, fuel injector devices each including a fuel inlet connected to receive fuel from said supply conduit system, said injector devices having discharge orifices disposed in said manifold structure, engine drivable means in said supply conduit operable to feed fuel to said injector devices, and fuel flow control valve apparatus connected in said supply conduit system downstream of said engine driven means for controlling fuel flow to said injector devices in dependence on engine loading represented by vacuum level in said manifold structure, said fuel flow control apparatus including a housing defining a chamber having a piston member mounted for slidable movement therein, a rotatable, liquid flow control valve member, means operably linking said piston and said rotary valve member to cause rotation of said valve member in response to sliding movement of said piston, said housing defining first, second and third passages, said first passage containing a fixed flow restrictor and communicating with said chamber and being connected to said manifold structure for response to vacuum level in said structure, said second passage defining a valve seating and connected at one end with said chamber and at its opposite end being vented to atmosphere, a second valve member adapted for operative cooperation with said seating to control venting of said chamber to atmosphere, resilient means contained by said chamber and urging said second valve member towards an unseated position, said third passage communicating with said manifold structure and operably communicating with a manifold structure vacuum responsive device whereby response of said vacuum pressure responsive device leads to a change in level of vacuum in said chamber following a change in level of vacuum in said manifold structure, means connecting said vacuum responsive device to said second valve member to apply to said second valve member a seating force which increases with increasing vacuum level in said manifold structure, said seating and unseating forces acting on said second valve member normally balancing each other and changes in vacuum level in said manifold structure initially causing imbalance of said seating and unseating forces and consequent change in vacuum level in said chamber causing sliding movement of said piston to restore balance between said seating and unseating forces.

13. A fuel injection system according to claim 12, wherein said vacuum responsive device comprises a diaphragm dividing a second chamber in said housing into first and second compartments, said first compartment communicating with said third passage and said second compartment being vented to atmosphere, means coupling said diaphragm and said second valve member, resilient means biasing said diaphragm to cause said coupling means to exert a predetermined seating force on said second valve member, and flexure of said diaphragm in response to increasing or decreasing vacuum level in said manifold structure causing said coupling means to increase or decrease respectively said seating force on said second valve member.

14. A fuel injection system according to claim 12, wherein said means operably linking said piston and said rotary valve member comprises a pivoted cam member, cam follower means engaging said cam member and connected with said rotary valve member for rotation of said rotary valve member in response to pivotal movement of said cam member, and means linking said piston and said cam member for pivoting said cam member in response to said sliding movement of said piston.

References Cited

UNITED STATES PATENTS

| | | | |
|---|---|---|---|
| 2,449,468 | 9/1948 | Greenland | 123—119 |
| 2,482,956 | 9/1949 | Wirth et al. | 123—119 |
| 2,893,365 | 7/1959 | Haefner | 123—119 |
| 2,843,096 | 7/1958 | Dolza et al. | 123—119 |
| 2,843,098 | 7/1958 | Dolza | 123—139.17 |
| 2,957,464 | 10/1960 | Dolza | 123—119 |
| 3,084,632 | 4/1963 | Wintercorn | 103—136 |
| 3,181,519 | 5/1965 | Dolza | 123—119 |
| 3,182,646 | 5/1965 | Kuechenmeister | 123—119 |
| 3,241,494 | 3/1966 | Johnson | 123—139.16 |
| 3,285,233 | 11/1966 | Jackson | 123—119 |

OTHER REFERENCES

Automobile Engineer, July 1964, pages 307 to 313, Tecalemit-Jackson Petrol Injection.

LAURENCE M. GOODRIDGE, *Primary Examiner.*